United States Patent
Cambois

(10) Patent No.: US 8,102,731 B2
(45) Date of Patent: Jan. 24, 2012

(54) METHOD FOR OPERATING MARINE SEISMIC VIBRATOR ARRAY TO ENHANCE LOW FREQUENCY OUTPUT

(75) Inventor: Guillaume Cambois, Singapore (SG)

(73) Assignee: PGS Geophysical AS, Lysaker (NO)

( * ) Notice: Subject to any disclaimer, the term of this patent is extended or adjusted under 35 U.S.C. 154(b) by 462 days.

(21) Appl. No.: 12/384,186

(22) Filed: Apr. 1, 2009

(65) Prior Publication Data
US 2010/0254215 A1   Oct. 7, 2010

(51) Int. Cl.
*G01V 1/38* (2006.01)
(52) U.S. Cl. ............. 367/15; 367/23; 181/113; 181/120
(58) Field of Classification Search .................... 367/23, 367/15; 181/113, 120
See application file for complete search history.

(56) References Cited

U.S. PATENT DOCUMENTS

| | | |
|---|---|---|
| 3,349,367 A | 10/1967 | Wisotsky |
| 3,863,202 A | 1/1975 | Landrum, Jr. |
| 4,564,927 A | 1/1986 | Kolb |
| 4,635,747 A | 1/1987 | Bird et al. |
| 4,918,668 A * | 4/1990 | Sallas ............................. 367/22 |
| 7,239,577 B2 | 7/2007 | Tenghamn et al. |
| 7,257,049 B1 | 8/2007 | Laws et al. |
| 7,639,567 B2 * | 12/2009 | Sitton et al. ................... 367/189 |
| 2004/0136266 A1 | 7/2004 | Howlid et al. |

FOREIGN PATENT DOCUMENTS

| | | |
|---|---|---|
| RU | 2279696 | 7/2006 |
| SU | 1376052 | 2/1988 |
| WO | WO 03/083514 | 10/2003 |

OTHER PUBLICATIONS

Peter J. Westervelt, (Apr. 1963); "Parametric Acoustic Array"; The Journal of the Acoustical Society of America, vol. 35, No. 4; pp. 535-537.
L.I. Popova, Examiner, Eurasian Search Report, Jul. 15, 2010.

* cited by examiner

*Primary Examiner* — Mark Hellner

(57) ABSTRACT

A method for operating marine seismic vibrators includes towing at least a first and a second marine seismic vibrator in a body of water beneath the hull of a vessel. At least a third marine seismic vibrator is towed at a selected depth in the water other than beneath the hull of the vessel. The at least first, second and third vibrators are operated to sweep through respective frequency ranges. The first and second frequency ranges have lowermost frequencies and uppermost frequencies respectively differing by a selected sub-harmonic frequency range. The third frequency range has a lowermost frequency at least equal to the uppermost frequency of one of the first and second frequency ranges and traverses a seismic frequency range of interest.

14 Claims, 1 Drawing Sheet

METHOD FOR OPERATING MARINE SEISMIC VIBRATOR ARRAY TO ENHANCE LOW FREQUENCY OUTPUT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic vibrators. More specifically, the invention relates to method for operating arrays of such marine vibrators to enhance low frequency content of the array signal output.

2. Background Art

Vibrator-type seismic energy sources known in the art impart seismic energy into the Earth's subsurface by moving a radiating surface in a particular manner. See, for example, U.S. Pat. No. 3,863,202 issued to Landrum, Jr. In one type of implementation, the radiating surface is coupled to a control system including a hydraulic ram and a control valve that selectively applies hydraulic pressure to each side of the hydraulic ram. The control valve is typically electrically operated. Electrical signals applied to the control valve generally correspond to the vibratory waveform that it is intended to be produced by the motion of the radiating surface. In order for the motion of the radiating surface to be efficiently coupled to the Earth, it is necessary to provide a large reactive mass coupled to the hydraulic ram opposite the radiating surface. In another implementation, a diaphragm placed in a body of water is moved in a similar manner through either electrical or electromechanical means.

A typical marine vibrator is illustrated and described in U.S. Pat. No. 3,349,367 issued to Wisotsky. Such vibrators comprise a sonic radiator driven by a hydraulic ram. The hydraulic pressures are derived from a surface source and applied by way of high pressure hoses to the hydraulic ram under control of a servo valve to effect movement of the sonic radiator over a predetermined frequency range. The vibrator is programmed through control signals to generate energy in the seismic frequency band between 10 and 190 Hz. In conducting the operations the vibrator output is swept through a range of frequencies as above noted either in an upsweep or downsweep. The inertial mass for the vibrator is provided by the structure housing the hydraulic ram and sonic radiator. Accordingly the housing such as that shown in FIG. 5 of the Wistosky '367 patent will vibrate at the same frequency as the sonic radiator and these vibrations are transmitted to any structure mounted on the housing, for example, a structure used to connect the marine vibrator to surface supporting and towing devices as well as to any equipment mounted to the structure near the vibrator. Another marine vibrator is described in U.S. Pat. No. 4,635,747 issued to Bird, Sr. et al.

A particular limitation to vibrator seismic sources known in the art relates to generating low frequency seismic energy, typically less than about 8 Hz. For such low frequencies, the reactive mass or diaphragm must be relatively large, and the amount of motion that must be imparted to the radiating surface is also relatively large. Controlling such motion so that it faithfully corresponds to the electrical control signal has also proven to be difficult.

Accordingly, there continues to be a need for marine seismic vibrator systems that provide sufficient low frequency energy for seismic surveying.

SUMMARY OF THE INVENTION

A method for operating marine seismic vibrators according to one aspect of the invention includes towing at least a first and a second marine seismic vibrator in a body of water beneath the hull of a vessel. At least a third marine seismic vibrator is towed at a selected depth in the water other than beneath the hull of the vessel. The at least first, second and third vibrators are operated to sweep through respective frequency ranges. The first and second frequency ranges have lowermost frequencies and uppermost frequencies respectively differing by a selected sub-harmonic frequency range. The third frequency range has a lowermost frequency at least equal to the uppermost frequency of one of the first and second frequency ranges and traverses a seismic frequency range of interest.

A method for seismic surveying according to another aspect of the invention includes towing at least a first and a second marine seismic vibrator in a body of water beneath the hull of a vessel. At least a third marine seismic vibrator is towed at a selected depth in the water other than beneath the hull of the vessel. At least one seismic sensor streamer is towed in the water. The at least first, second and third vibrators are each operated to sweep through respective frequency ranges. The first and second frequency ranges have lowermost frequencies and uppermost frequencies respectively differing by a selected sub-harmonic frequency range. The third frequency range has a lowermost frequency at least equal to the uppermost frequency of one of the first and second frequency ranges and traverses a seismic frequency range of interest. Signals produced by sensors in the at least one streamer in response to the operating the vibrators are recorded.

Other aspects and advantages of the invention will be apparent from the following description and the appended claims.

DETAILED DESCRIPTION

Figure 1:
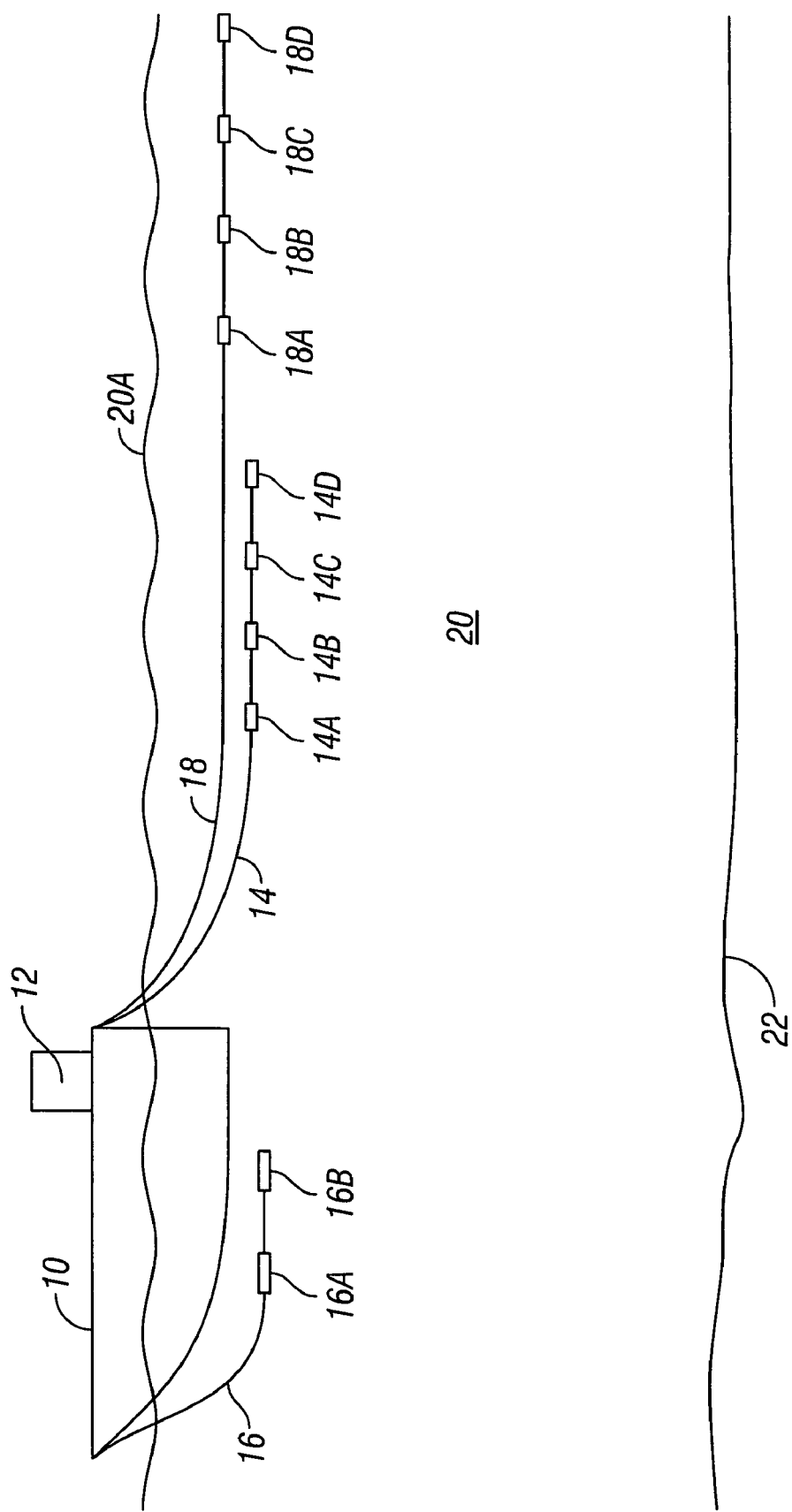
FIG. 1 shows an example arrangement of seismic vibrators according to the invention and an accompanying seismic data acquisition system.

An acoustic source emitting frequency $f_1$ will also emit harmonic frequencies $2f_1$, $3f_1$ . . . because of non-linear behavior of the components of the acoustic source. Two acoustic sources spatially close to each other, and emitting energy at frequencies $f_1$ and $f_2$, respectively, will also result in frequencies $f_1+f_2$ and $|f_1-f_2|$. It is the latter frequency, called a "sub-harmonic" that is of interest in the present invention. Assuming, for example, frequencies of 10 and 12 Hz for the foregoing two sources, the combination of the two sources will result in 2 Hz sub-harmonic energy being propagated through the medium to which the sources are coupled. Such an arrangement is called a parametric array.

The theory of parametric arrays states two important points. First, the amplitude of the sub-harmonic $|f_1-f_2|$ attenuates 12 dB/octave compared to the amplitude of the fundamental frequencies. Second, the footprint (Fresnel zone) of the sub-harmonic is substantially the same as that of the fundamental frequencies. In the above described example, the amplitude of the 2 Hz sub-harmonic would be about 30 dB lower than the amplitude emitted at 10 and 12 Hz at any point in space. But the Fresnel zone should be on the order of 125-150 meters instead of the 750 meters expected from a 2 Hz wave propagating in water.

Marine vibrators emitting energy in the range of 10 to 12 Hz as in the present example should ideally be towed 30 meters deep in the water to benefit from the amplitude boosting of the source ghost (energy reflected from the water surface by the water-air interface after being emitted by the source). At such depth, however, the 2 Hz sub-harmonic will be strongly attenuated by the source ghost, as much as an additional 12 dB beyond the 30 dB described above with reference to the parametric array theory.

To circumvent the foregoing problem it is possible to position the vibrators below the hull of the vessel used to tow the vibrators in a body of water. This is because, for a typical steel hulled vessel the steel-water interface has a positive reflection coefficient whereas the air-water interface has a negative reflection coefficient. Therefore, the source ghost resulting from acoustic reflection from a steel hull will enhance low frequency acoustic energy rather than attenuating it. For ordinary vibrators, for very low frequencies such technique of positioning vibrators beneath the hull of the tow vessel has not proven successful because the Fresnel zone of the low frequency energy is typically larger than the vessel. As a result, the emitted energy will produce source ghost having larger area under the air-water interface as compared with the area of the steel-water interface. As a result the source ghost will be more driven by the air-water interface than the steel-water interface, thus attenuating low frequencies rather than enhancing them.

However, in the case of the parametric array, the Fresnel zone of the sub-harmonic energy is essentially the same as that of the fundamental frequency energy. This means that the 2 Hz sub-harmonic described above has a Fresnel zone of about 125-150 m, which is much closer to the actual size of the vessel.

Having explained basic principles of parametric arrays, an example seismic vibrator array and marine seismic data acquisition system will be explained with reference to FIG. 1. A marine seismic survey vessel 10 moves along the surface 20A of a body of water 20 such as a lake or the ocean. The vessel includes equipment shown generally at 12 and for convenience referred to as a "recording system" that includes components (none shown separately) such as navigation devices to determine the geodetic position of the vessel 10, devices to actuate seismic vibrators (explained below) in the water 20 at selected times and in selected modes, and devices to record signals produced by sensors (explained below) in one or more sensor cables 18 called "streamers" towed by the vessel 10 or by another vessel (not shown).

In the present example, high frequency marine seismic vibrators (e.g., having acoustic energy output from typically 25 Hz to a selected frequency within the seismic frequency range of interest, typically 100 to 200 Hz), shown at 14A, 14B, 14C, 14D may be towed by a first source cable 14 behind the vessel 10 at a selected depth, such as about 15 meters or less to benefit from the source ghost produced by the air-water interface (surface 20A). Low frequency marine seismic vibrators 16A, 16B may be towed by a second source cable such that the vibrators 16A, 16B are disposed below the hull of the vessel 10 as shown to benefit from the source ghost produced by the steel-water interface. The low frequency vibrator(s) 16A may include one vibrator or a plurality of such vibrators typically operating in the 12-25 Hz range. The low frequency vibrators may include one or more vibrators, shown at 16B, simultaneously operating typically in the 10-15 Hz range. Typically the vibrators will each be operated to produce a sweep of frequencies from one end of its frequency range to the other, called a "chirp", for each actuation of each vibrator. In the foregoing example, the low frequency vibrators 16A, 16B may sweep the described frequency ranges of 12-25 Hz and 10-15 Hz, respectively. If the sweeps of the respective vibrators are suitably synchronized, for each sweep thereof, a sub-harmonic sweep in the range of 2-10 Hz will be generated. The size of the Fresnel zone of such sub-harmonic sweep may range from 60 to 150 meters. In one example, the sweep frequencies of the low frequency vibrators may be selected such that the Fresnel zone of the sub-harmonic seismic energy has an area at most equal to an area of the hull of the vessel 10. The under hull vibrators 16A, 16B are shown as being towed by a cable, but they may also be suitably mounted in fixed positions to the hull of the vessel 10. Preferably the under hull vibrators are disposed at a depth proximate the hull or are mounted on the hull of the vessel 10.

Simultaneously with operating the under-hull vibrators 16A, 16B as described above, the behind-vessel vibrators 14A, 14B, 14C, 14D may be operated to sweep through their respective frequency ranges for each actuation thereof.

Non-limiting examples of marine seismic vibrators are illustrated and described in U.S. Pat. No. 3,349,367 issued to Wisotsky and U.S. Pat. No. 4,635,747 issued to Bird, Sr. et al. The configuration of marine vibrator is not a limitation on the scope of the present invention.

Seismic energy emitted by the vibrators operated as explained above will travel outwardly from each vibrator, travel through the water bottom 22 into formations below the water bottom. Seismic energy will be reflected at acoustic impedance boundaries (not shown) below the water bottom 22, and travel upwardly until it is detected by seismic sensors 18A-18D on the streamer 18. The recording system 12 may make records of signals generated by the sensors 18A-18D, typically time indexed with respect to the actuation of the vibrators. The sensors 18A-18D may be any known device used in a seismic streamer to detect seismic energy, including pressure or pressure time gradient responsive sensors, particle motion responsive sensors, and combinations thereof. The type of sensor is not a limit on the scope of the present invention. A non-limiting example sensor streamer that may be used with the present invention is described in U.S. Pat. No. 7,239,557 issued to Tenghamn et al. and assigned to an affiliate of the owner of the present invention.

The effect of the source ghost on pressure waves is to multiply some frequencies in the output of the source by zero while others are multiplied by 2. The frequencies multiplied by 2 can be calculated by the expression $(V/4d)*(2n+1)$ where V is the acoustic velocity of water (about 1500 meters per second) and d is the depth of the source (e.g., vibrator) in the water. In the foregoing expression n is an integer. As an example, a sourced operated at a water depth of 15 meters multiplies by 2 the amplitude of energy at frequencies 25 Hz, 75 Hz, 125 Hz, and so on. If one of the vibrators (e.g., any of 14A through 14D) sweeps the frequency range 25 to 75 Hz for example, the optimum depth will be the one that multiplies by 2 the amplitude of the midpoint frequency of the sweep range (i.e., 50Hz). In such case the optimum depth is therefore 7.5 m. The operating depths and frequency sweep ranges of the vibrators arrays (14A, 14B, 14C, 14D) can be optimized to maximize the total energy output.

Methods according to the invention may provide more effective use of marine vibrators by providing greater energy output at lower frequencies than is possible using techniques known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating marine seismic vibrators, comprising:
    towing at least a first and a second marine seismic vibrator in a body of water beneath the hull of a vessel;
    towing at least a third marine seismic vibrator at a selected depth in the water at a position relative to the vessel other than beneath the hull of the vessel;
    operating the at least first, second and third vibrators to sweep through respective frequency ranges, the first and second frequency ranges each having a lowermost frequency and an uppermost frequency respectively differing by a selected sub-harmonic frequency range, the third frequency range having a lowermost frequency at least equal to the uppermost frequency of one of the first and second frequency ranges and traversing a seismic frequency range of interest.

2. The method of claim 1 wherein the first frequency range is about 10 to 15 Hz.

3. The method of claim 1 wherein the second frequency range is about 12 to 25 Hz.

4. The method of claim 1 wherein the third frequency range is about 25 to 200 Hz.

5. The method of claim 1 wherein the first and second frequency ranges are selected such that a Fresnel zone of seismic energy in the sub-harmonic frequency range has an area at substantially covered by the hull of the vessel.

6. The method of claim 1 wherein the first, second and third vibrators are each operated at a depth in the water related to the respective first, second and third frequency ranges.

7. The method of claim 6 wherein the depth is selected to optimize output of the respective vibrator at a mid point of the respective frequency range.

8. A method for seismic surveying, comprising:
    towing at least a first and a second marine seismic vibrator in a body of water beneath the hull of a vessel;
    towing at least a third marine seismic vibrator at a selected depth in the water at a position relative to the vessel other than beneath the hull of the vessel;
    towing at least one seismic sensor streamer in the water;
    operating the at least first, second and third vibrators to sweep through respective frequency ranges, the first and second frequency ranges having lowermost frequencies and uppermost frequencies respectively differing by a selected sub-harmonic frequency range, the third frequency range having a lowermost frequency at least equal to the uppermost frequency of one of the first and second frequency ranges and traversing a seismic frequency range of interest; and
    recording signals produced by sensors in the at least one streamer in response to the operating the vibrators.

9. The method of claim 8 wherein the first frequency range is about 10 to 15 Hz.

10. The method of claim 8 wherein the second frequency range is about 12 to 25 Hz.

11. The method of claim 8 wherein the third frequency range is about 25 to 200 Hz.

12. The method of claim 8 wherein the first and second frequency ranges are selected such that a Fresnel zone of seismic energy in the sub-harmonic frequency range has an area at substantially covered by the hull of the vessel.

13. The method of claim 8 wherein the first, second and third vibrators are each operated at a depth in the water related to the respective first, second and third frequency ranges.

14. The method of claim 13 wherein the depth is selected to optimize output of the respective vibrator at a mid point of the respective frequency range.

* * * * *